(12) United States Patent
Frenkel et al.

(10) Patent No.: US 7,730,145 B1
(45) Date of Patent: Jun. 1, 2010

(54) ANTI-UCE SYSTEM AND METHOD USING CLASS-BASED CERTIFICATES

(75) Inventors: Richard Frenkel, 3 Grant Rd., Swampscott, MA (US) 01907; Nat Tuck, 81 High St., Rockport, MA (US) 01966

(73) Assignees: Richard Frenkel, Swampscott, MA (US); Nat Tuck, Rockport, MA (US)

( * ) Notice: Subject to any disclaimer, the term of this patent is extended or adjusted under 35 U.S.C. 154(b) by 522 days.

(21) Appl. No.: 11/692,016

(22) Filed: Mar. 27, 2007

(51) Int. Cl.
*G06F 13/00* (2006.01)
(52) U.S. Cl. .................... 709/206; 709/219; 709/224
(58) Field of Classification Search ................. 709/206, 709/217, 219, 223, 224, 250
See application file for complete search history.

(56) References Cited

U.S. PATENT DOCUMENTS

| 2002/0120600 | A1 | 8/2002 | Schiavone |
| 2002/0181703 | A1 | 12/2002 | Logan |
| 2004/0205135 | A1 | 10/2004 | Hallam-Baker |
| 2004/0236702 | A1* | 11/2004 | Fink et al. ...................... 705/73 |
| 2006/0168057 | A1 | 7/2006 | Warren |
| 2006/0200487 | A1* | 9/2006 | Adelman et al. ............. 707/102 |
| 2006/0206713 | A1 | 9/2006 | Hickman |
| 2007/0005976 | A1 | 1/2007 | Riitinen |
| 2008/0133907 | A1* | 6/2008 | Parkinson ................... 713/158 |

* cited by examiner

*Primary Examiner*—Viet Vu
(74) *Attorney, Agent, or Firm*—Mills & Onello, LLP

(57) ABSTRACT

An anti-UCE system comprises a certificate issuance module configured to issue certificates to e-mail users and to maintain a registry of issued certificates with an indication of validity for each issued certificate. There is a plurality of possible certificates, each having a class with associated terms of service defining e-mail transmission limitations for the class. A certificate status module determines whether e-mail signed using the certificate violates the terms of service for the class. A filter module receives e-mails intended for e-mail users, and is configured to determine if a received e-mail is signed with a certificate from the plurality of certificates and, if signed, to determine from the certificate status module if the certificate is valid based on an identity of the sender and a class indicated in the certificate, and to forward the e-mail to an intended e-mail user if the certificate is valid.

50 Claims, 7 Drawing Sheets

US 7,730,145 B1

ANTI-UCE SYSTEM AND METHOD USING CLASS-BASED CERTIFICATES

FIELD OF INTEREST

The present inventive concepts relate to the field of computer systems, and more specifically to systems and methods for mitigating the problem of "SPAM" in e-mail systems.

BACKGROUND

Some studies have shown that unsolicited commercial e-mail (UCE) or "SPAM," i.e., unsolicited e-mail typically of a commercial nature that is sent out in bulk, accounts for about 75% of all e-mail. The pernicious nature of UCE is well known, as are its costs to individuals, companies, and society. It has also become apparent that current and even most proposed methods of control will largely fail to control the problem.

Current technology relies mostly on "fingerprinting" and "Bayesian filtering" to detect UCE. The problem with such technologies is that it is relatively easy for spammers to adopt counter-measures to get around even the best filtering systems. And worse, filtering systems always have some false positives, which can result in lost e-mail that has been improperly marked as UCE.

Human Interactive Proof (HIP) approaches and other challenge-response methods are more effective, but annoy senders and run into problems with newsletters and other opt-in bulk e-mail. Furthermore, proving yourself, as a sender, to one recipient via answering a challenge does nothing to authenticate you to another recipient. Hence, you have to go through this process with all recipients.

Current and proposed methods for controlling UCE fail uniquely identify the sender of the e-mail. Consequently, control is applied to the e-mail being sent rather than to the sender, who in any case can usually not be identified. This makes it possible for "serial spammers" to send round after round of e-mail using the latest in UCE detection evasion techniques.

There are other suggestions for controlling UCE that require changes to current Internet Standards and work with e-mail servers rather than clients. But apparently none of them call for unambiguous authentication of the sender. Also it takes a considerable time for a consensus to be achieved and Internet standards to be changed.

Laws that make UCE illegal are ineffective, as spammers almost always use false address information, "hijacking" a domain name as a return address. Not only does this make it difficult to trace the spammer, but often results in some completely innocent domain name holder being flooded with rejected e-mail.

SUMMARY OF INVENTION

In accordance with one aspect of the invention, provided is an anti-UCE certificate system accessible via a network. The system comprises at least one storage media having stored therein a plurality of certificates, each of the plurality of certificates having a class that identifies a different type of e-mail, each class having different terms of service defining e-mail transmission limitations for the class. A certificate issuance module is configured to issue certificates from the plurality of certificates to specific e-mail users, the issued certificates configured to sign e-mails generated by the respective users. And a certificate status module is configured to accept requests for the status of the certificates from signed e-mails, enforce the terms of service of each certificate by accumulating metrics for each certificate, and suspend or revoke a certificate if it is used in violation of its terms of service.

Each of the plurality of certificates can be valid for only one class.

The plurality of certificates can include a first certificate that has a first class that identifies an e-mail as a personal e-mail, a second certificate that has a second class that identifies an e-mail as a solicited e-mail, and a third certificate that has a third class that identifies an e-mail as an unsolicited e-mail.

The certificate issuance module can be configured to maintain a registry of issued certificates with an indication of validity for each issued certificate.

The certificate issuance module can form part of a certificate management system and the certificate status module can form part of a certificate status system comprising a set of servers, each server configured to accumulated metrics and enforce the terms of service for a set of certificates from the issued certificates.

As a prerequisite of issuing a certificate, the certificate issuance module can be configured to authenticate a user of the certificate using at least one of a phone number, credit card number, or an e-mail address of the user.

The certificate issuance module can be configured to deny issuance of a certificate to a user if the user has a prior issued certificate with a status other than valid.

The certificate issuance module can be configured to receive a Web-based certificate request from the user and to issue a certificate in response to the request.

The certificate status module can be configured to determine if a number of e-mails signed with a certificated in a predefined time period exceeds a threshold number of e-mails allowed in the predefined time period for the certificate's class.

In accordance with another aspect of the invention, provided is an e-mail filtering system accessible via a network for authenticating a certificate used to sign an e-mail prior to delivering the e-mail from a sender to an intended recipient. The system comprises a filter module configured to determine a sender identity and a class of the e-mail from the certificate used to sign the e-mail. The filter module is also configured to obtain an indication of validity of the certificate from a certificate status module configured to determine validity based on the sender identity, the class, and accumulated metrics for the certificate. And the filter module is configured to forward the e-mail to the recipient if the certificate is valid. The certificate is from a plurality of certificates, each certificate having a class that identifies a different type of e-mail, each class having different terms of service defining e-mail transmission limitations for the class.

Each of the plurality of certificates can be valid for only one class.

The plurality of certificates can include a first certificate that has a first class that identifies an e-mail as a personal e-mail, a second certificate that has a second class that identifies an e-mail as a solicited e-mail, and a third certificate that has a third class that identifies an e-mail as an unsolicited e-mail.

The validity of the certificate can be further determined based on whether the accumulated metrics indicate a violation of the terms of service for the class.

The filter module can be further configured to hold or discard the e-mail if the certificate is not determined to be valid.

The filter module can be further configured to initially determine if the e-mail has been signed using the certificate.

The filter module can be configured to determine if the sender of an unsigned e-mail is on a white list and, if so, to send the unsigned e-mail to the recipient.

The filter module can be configured to determine if the sender of an unsigned e-mail is on a black list and, if so, to discard the unsigned e-mail.

The filter module can be configured to present the sender of an unsigned e-mail with a challenge-response and, if the sender satisfies the challenge-response, to send the e-mail to the recipient.

The filter module can be configured to present the sender of an unsigned e-mail with an opportunity to obtain a new certificate.

The filter module can be configured to enable e-mail users to define preferences for handling unsolicited e-mail from unknown senders.

The filter module can be configured as an add-on to an e-mail client program.

The e-mail filtering system can be configured as a proxy e-mail server.

In accordance with another aspect of the invention, provided is an anti-UCE system. The system comprises a certificate issuance module configured to issue certificates to e-mail users and to maintain a registry of issued certificates with an indication of validity for each issued certificate, wherein there are a plurality of possible certificates, each certificate having a class with associated terms of service defining e-mail transmission limitations for the class. A certificate status module is configured to accept requests for the status of certificates from signed e-mails, enforce the terms of service of each certificate by accumulating metrics for each certificate, and suspend or revoke a certificate if it is used in violation of its terms of service. And a filter module is configured to receive e-mails intended for a set of e-mail users as recipients, and to determine if a received e-mail is signed with a certificate from the plurality of certificates and, if signed, to determine from the certificate status module if the certificate is valid based on an identity of the sender and a class indicated in the certificate, and to forward the e-mail to an intended recipient if the certificate is valid.

The plurality of certificates can include a first certificate that has a first class that identifies an e-mail as a personal e-mail, a second certificate that has a second class that identifies an e-mail as a solicited e-mail, and a third certificate that has a third class that identifies an e-mail as an unsolicited e-mail.

The certificate can have a status of valid, suspended, or revoked.

As a prerequisite of issuing the certificate, the certificate issuance module can be configured to authenticate the user using at least one of a phone number, credit card number, or e-mail address of the user.

The filter module can be configured to determine if the sender of an unsigned e-mail is on a white list and, if so, to send the unsigned e-mail to the recipient.

The filter module can be configured to determine if the sender of an unsigned e-mail is on a black list and, if so, to discard the unsigned e-mail.

The filter module can be configured to present the sender of an unsigned e-mail with a challenge-response and, if the sender satisfies the challenge-response, to send the e-mail to the recipient.

The filter module can be configured to present the sender of an unsigned e-mail with an opportunity to obtain a new certificate.

The filter module can be configured to provide a link enable the set of e-mail users to define preferences for handling unsolicited e-mail from unknown senders.

In accordance with another aspect of the invention, provided is a method of filtering e-mail by authenticating a certificate used to sign an e-mail prior to delivering the e-mail from a sender to an intended recipient. The method comprises determining a sender identity and a class of the e-mail from the certificate used to sign the e-mail. The method further includes obtaining an indication of validity of the certificate based on the sender identity, the class, and accumulated metrics for the certificate. The method further includes forwarding the e-mail to the recipient if the certificate is valid. The certificate is from a plurality of certificates, each certificate having a class that identifies a different type of e-mail, each class having different terms of service defining e-mail transmission limitations for the class.

Each of the plurality of certificates can be valid for only one class.

The plurality of certificates can be include a first certificate that has a first class that identifies an e-mail as a personal e-mail, a second certificate that has a second class that identifies an e-mail as a solicited e-mail, and a third certificate that has a third class that identifies an e-mail as an unsolicited e-mail.

The method can include further determining the validity of the certificate based on whether the accumulated metrics indicate a violation of the terms of service for the class.

The method can include holding or discarding the email if the certificate is not determined to be valid.

The method can include initially determining if the e-mail has been signed using the certificate.

The method can include determining if the sender of an unsigned e-mail is on a white list and, if so, sending the unsigned e-mail to the recipient.

The method can include determining if the sender of an unsigned e-mail is on a black list and, if so, discarding the unsigned e-mail.

The method can include presenting the sender of an unsigned e-mail with a challenge-response and, if the sender satisfies the challenge-response, sending the e-mail to the recipient.

The method can include presenting the sender of an unsigned e-mail with an opportunity to obtain a new certificate.

The method can include enabling e-mail users to define preferences for handling unsolicited e-mail from unknown senders.

In accordance with another aspect of the invention, provided is an anti-UCE method. The method comprises issuing certificates to e-mail users and maintaining a registry of issued certificates with an indication of validity for each issued certificate. There are a plurality of possible certificates, each certificate having a class with associated terms of service defining e-mail transmission limitations for the class. The method includes enforcing the terms of service of each certificate by accumulating metrics for each certificate and suspending or revoking a certificate if it is used in violation of its terms of service based on the accumulated metrics. The method also includes receiving e-mails intended for a set of e-mail users as recipients, determining if a received e-mail is signed with a certificate from the plurality of certificates and, if signed, determining if the certificate is valid based on an identity of the sender and a class indicated in the certificate. The method then includes forwarding the e-mail to an intended recipient if the certificate is valid.

The plurality of certificates can include a first certificate that has a first class that identifies an e-mail as a personal e-mail, a second certificate that has a second class that identifies an e-mail as a solicited e-mail, and a third certificate that has a third class that identifies an e-mail as an unsolicited e-mail.

The indication of validity can be an indication of valid or revoked.

As a prerequisite of issuing the certificate, the method can include authenticating the user using at least one of a phone number, credit card number, or e-mail address of the user.

The method can include determining if the sender of an unsigned e-mail is on a white list and, if so, sending the unsigned e-mail to the recipient.

The method can include determining if the sender of an unsigned e-mail is on a black list and, if so, discarding the unsigned e-mail.

The method can include presenting the sender of an unsigned e-mail with a challenge-response and, if the sender satisfies the challenge-response, sending the e-mail to the recipient.

The method can include presenting the sender of an unsigned e-mail with an opportunity to obtain a new certificate.

The method can include providing a link configured to enable the set of e-mail users to define preferences for handling unsolicited e-mail from unknown senders.

BRIEF DESCRIPTION OF THE DRAWINGS

The drawing figures depict preferred embodiments by way of example, not by way of limitation. In the figures, like reference numerals refer to the same or similar elements.

DETAILED DESCRIPTION OF PREFERRED EMBODIMENT

Figure 1A:
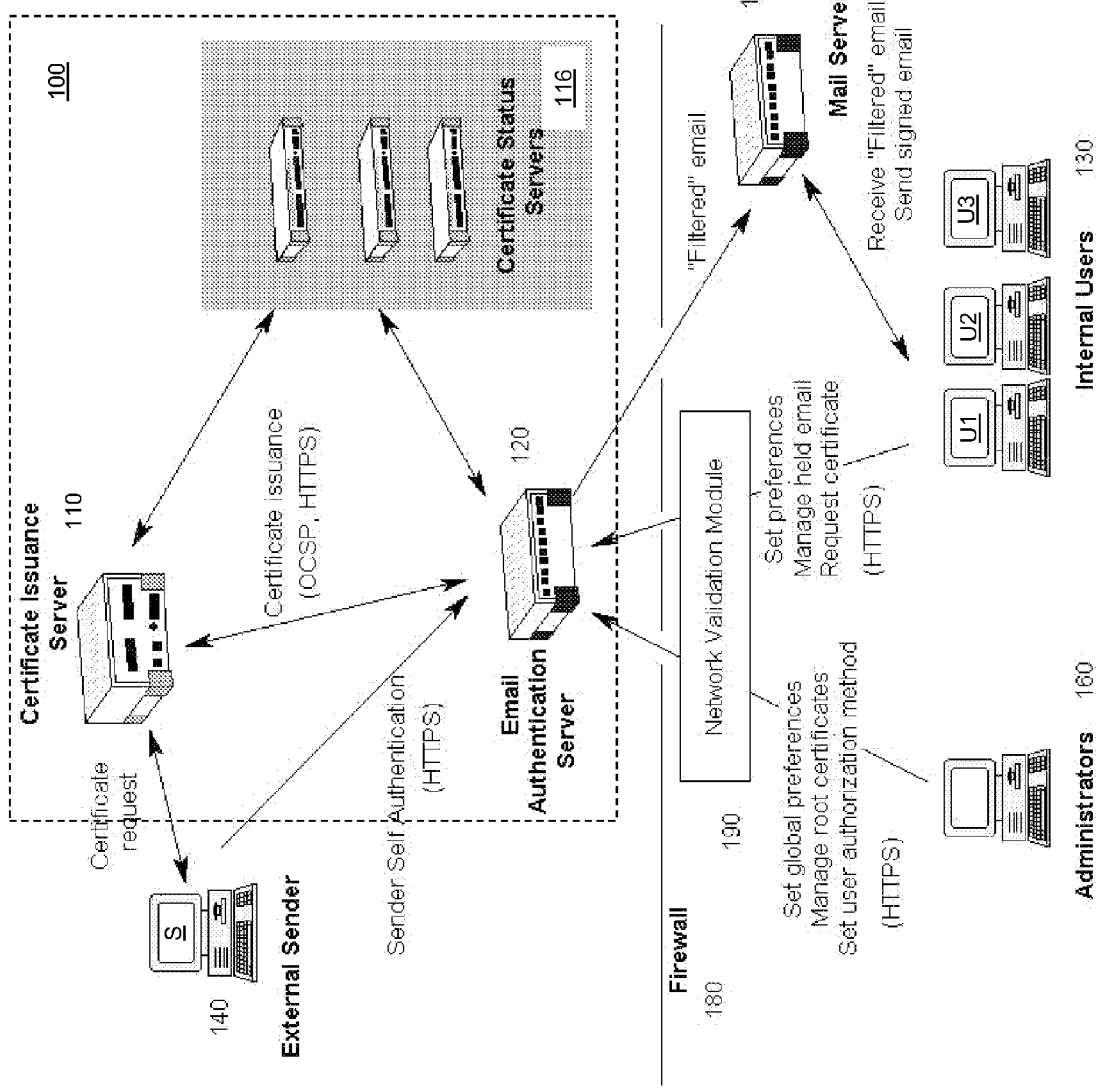
FIG. 1A is a diagram of a network of devices comprising an anti-UCE system in accordance with aspects of the present invention.

It will be understood that, although the terms first, second, etc. can be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

System Overview

In accordance with various aspects of the present invention, an anti-UCE system can include: a certificate issuance module configured to issue to an e-mail user a certificate that includes an identity of the user and an e-mail class; a filter module configured to authenticate received e-mails using the certificate; and a certificate status module configured to check the status of the certificate of signed e-mails received by the filter module. The e-mails can be signed by an e-mail signing module configured to sign e-mails generated by a user with the certificate, which can take the form of an add-on to an e-mail client. The certificate issued by the certificate issuance module can authenticate the user to all recipients (or recipient devices) configured to use the anti-UCE system technology, and newsletters or other bulk e-mail can be authenticated the same way. There is thus considerable incentive for obtaining a certificate and a filter module that recognizes such authenticated e-mail. The filter module can be implemented at an e-mail server level (as shown in FIGS. 1A and 1B) or at the e-mail client level (as shown in FIG. 1C)—as examples.

In the preferred form, the authentication of a received e-mail is based, at least in part, on an identity of the e-mail sender and the class (and associated terms of service) reflected in the certificate used to sign the e-mail. The filter module can also be configured to reject an e-mail that cannot be authenticated or to seek further assurances before passing the received e-mail to its intended recipient.

Figure 1B:
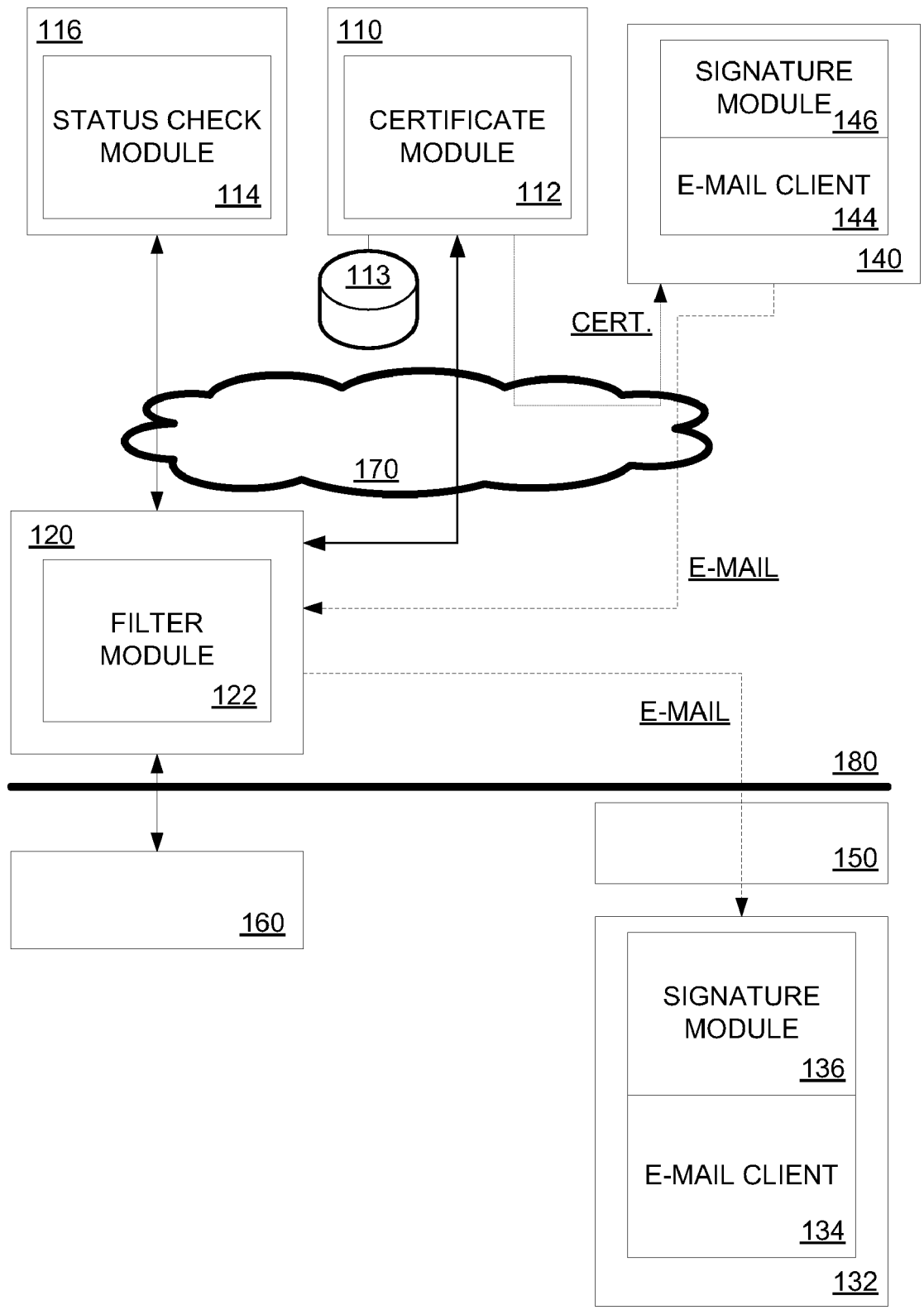
FIGS. 1B and 1C are different implementations of the system of FIG. 1A.
Figure 1C:
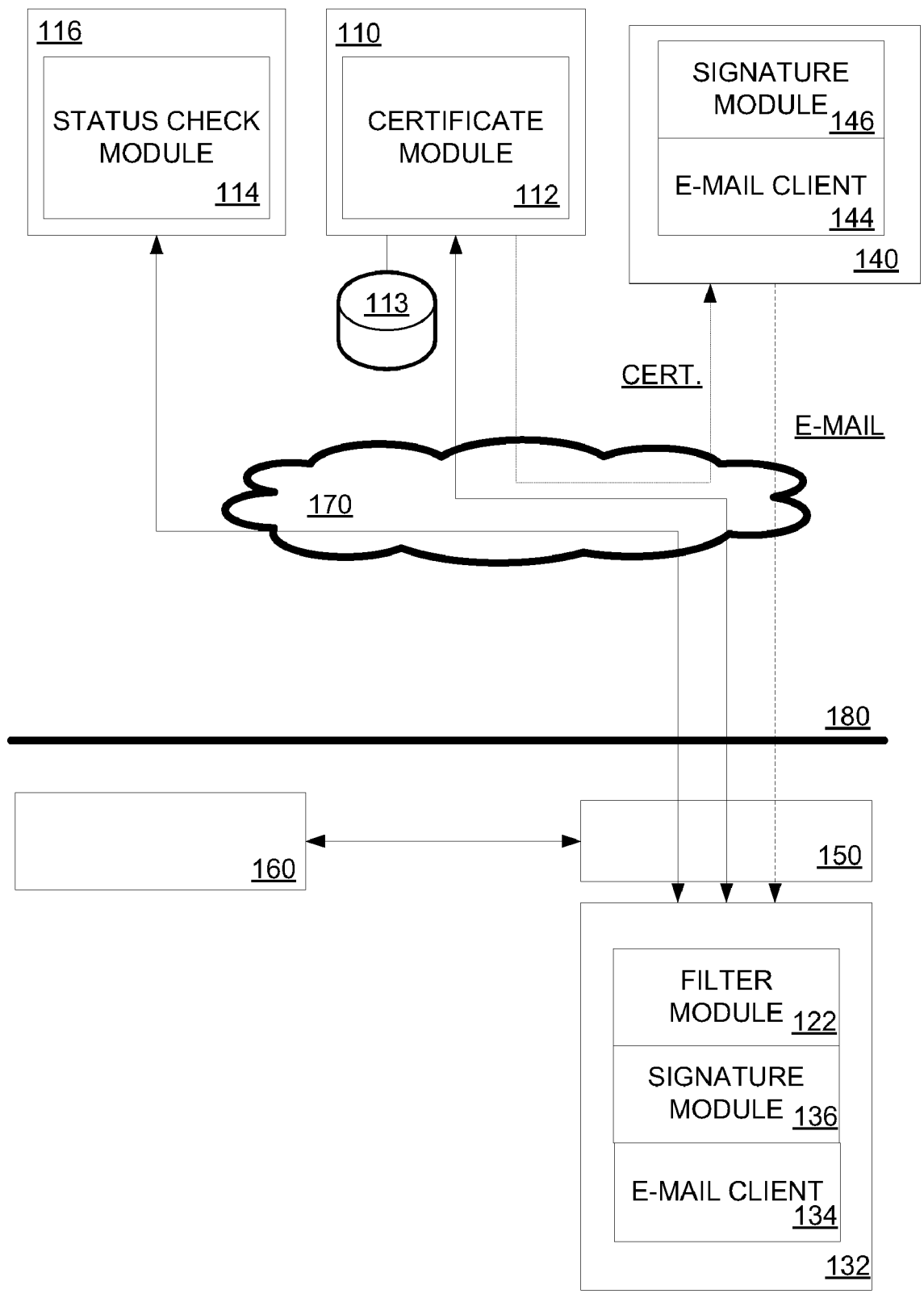

FIG. 1A is a diagram including an embodiment of a set of networked devices that can implement an anti-UCE system 100. In this embodiment, system 100 includes a certificate management system 110, a filter system 120, and a certificate status system 116. Certificate management system 110 can be implemented as a central system or server configured to issue certificates, e.g., as a root certificate issuer. Each of the certificates has a class that identifies a different type of e-mail to be sent from the user—as a sender. Each class has associated terms of service (TOS) that define limitations on e-mail transmissions from the user. Certificate status system 116 can be configured to revoke or suspend a certificate in real or near-real time when the certificate is used in violation of the terms of service for its class. The certificate status system 116 can take the form of a plurality of certificate status servers 116.

In FIG. 1A the filter system is implemented on a standalone server, such as a proxy e-mail server that acts as an e-mail authentication system or server (EAS) 120. Thus EAS 120 can be implemented as an "appliance" that sits on a network of an organization or it can be implemented as a system external to the organization's network. In this embodiment EAS 120 sits outside a firewall 180 of an organization, and is configured to receive an e-mail, perform authentication, and selectively forward e-mail to an e-mail server 150 for delivery to the intended recipient, such as one of the internal users represented by user devices 130.

A network validation module 190 can be included behind firewall 180. Network validation module 190 can be configured to set global network preferences, manage root certificates, and set user authorization methods in conjunction with admin device 160. Network validation module 190 can also be configured to set user preferences, manage held e-mail and request certification in conjunction with users 130.

E-mail server 150 can be, for example, an e-mail server of an organization or company. In the preferred form EAS 120 receives the e-mail before e-mail server 150, but in other embodiments e-mail server 150 could receive the e-mail and pass it to EAS 120 for authentication before being delivered to the recipient. Once authentication is completed, e-mail server 150 could then deliver the e-mail to the recipient. In another embodiment EAS 120 and e-mail server 150 could be combined to form an integrated system. EAS 120 can communicate with certificate status servers 116 to perform certificate verification, e.g., to confirm that the certificate has not been suspended or revoked and to ensure the e-mail complies with the corresponding TOS.

In this embodiment, the certificate management system 110 is separate from the certificate status servers 116, but in other embodiments they could be physically and/or logically integrated. The certificate status servers 116 are, therefore, generally independent of the certificate management system 110, which allows for scalability. In one form, each certificate is validated by one of the certificate status servers 116. More servers can easily be added to scale up the certificate status capability. In such a case, the EAS 120 can include an algorithm that determines which of the certificate status servers 116 to use for authentication. The certificate status checking servers 116 can each be configured with a certificate status module 114 configured to determine if an e-mail violates the TOS for its certificate's class, and can maintain a copy of the TOS. The chosen status server can transmit a revocation or suspension message to the certificate management system 110, if necessary. The certificate management system 110 then note the status. If the certificate status module 114 determines that the present e-mail did not violate the TOS, the certificate status module 114 can then check the status indication at certificate management system 110. In either case, the certificate status servers 116 then report the certificate status to EAS 120.

EAS 120 can be configured by an administrator using admin system 160 not to verify internal e-mails, i.e., e-mails between two users within the same organization. Internal e-mails could be passed directly to e-mail server 150 for delivery.

The authentication process is based on the certificates issued to e-mail users 130. To obtain a certificate an e-mail user provides some form of identification, e.g., an e-mail address, and agrees to certain terms of service (TOS). Once the e-mail certificate is obtained the user signs its e-mails with the certificate and if the e-mail complies with the TOS then the e-mail is authenticated as valid by the EAS 120. Once authenticated, the e-mail can be forwarded to the recipient's e-mail server.

In contrast to typical UCE filtering systems, making authentication of an e-mail based on the identity of the sender in accordance with the present invention has many benefits. That is, registration of a sender allows that e-mails from that sender to be authenticated through the EAS 120, but violation of the TOS can result of revocation of those rights.

EAS 120 is preferably standards based, so sender-to-receiver authentication can be accomplished using public key and other available technologies in a new way. Authentication is accomplished using certificates issued to specific senders—each sender signs its own e-mail using its certificate. EAS 120 receives the signed e-mail and inspects the certificate to determine the identity of the sender.

In the context of an organization, EAS 120 provisions members of the organization (e.g., employees of a company) with e-mail (e.g., S/Mime) certificates that lets those members send signed and optionally encrypted e-mail. In such an embodiment, the certificates are issued and managed from certificate management system 110, acting as a root Certificate Authority, rather than the organization's own internal certificate authority. However, other entities and organizations could issue certificates containing the class identifiers. In the preferred form, the certificates will be accepted as valid by available e-mail applications, such as Outlook™ (by Microsoft Corporation), Netscape™ Mail (by Netscape Communications Corporation), and most other e-mail clients. Certificates offer the benefits of e-mail authentication, non-repudiation, make tampering with e-mail content immediately detectable, and can be used to encrypt e-mail contents. Smart card based certificates can also be used in various embodiments. Certificates and public key encryption are used for e-mail authentication and security, in this embodiment.

Additionally, EAS 120 can also be configured to provide virus scanning on all incoming e-mail and attachments, white and black list processing, and other tools, all available from a Web interface.

FIG. 1B is a block diagram of an embodiment of modules, including those that can be used to implement the anti-UCE system 100. Certificate management system 110 includes a certificate issuance module 112 configured to issue certificates to e-mail users, such as sender S at computer 140 and users U1, U2, and U3 at computers 130. The certificate indicates a class of e-mail that the user can send. The classes can be defined in any of a variety of manners. For example, in the preferred embodiment at least three classes are defined: class 1—personal e-mail; class 2—newsletters and other solicited bulk e-mail; and class 3—unsolicited bulk e-mail. In other implementations classes could be defined differently, but preferably they allow e-mail to be distinguished relative to the likelihood that the e-mail is or is not UCE.

E-mail users can apply for a personal certificate that they can use to sign all of their e-mail automatically through their respective e-mail programs, such as Outlook™ by Microsoft Corporation. Certificate management system 110 can keep a registry 113 of issued certificates. The registry 113 can include for each certificate an identity of the user to which the certificate was issued and the class of the certificate. Certificate management system 110 can also include the TOS definitions for each class. The registry 113 can also maintain a status of each issued certificate, such as whether the certificate is valid, suspended, or revoked.

Each of computers 130 and 140 can be used to send and receive e-mails, so can be any of a variety of devices, including a personal computer, personal digital assistant, or other similarly capable device. Computer 140 is configured to communicate over a network 170, such as the Internet. Accordingly, computer 140 includes an e-mail client program 144, such as Outlook™. A signature module 146 can also be included that is configured to sign the user's e-mails with the user's certificate. If a user has multiple certificates, the user chooses the appropriate certificate (e.g. to send a newsletter) prior to sending the e-mail. Signature module 146 can take the form of an add-on to the e-mail client program 144, which could be downloadable from certificate management system 110 upon registration by the user. However, in this embodiment, the signature module 146 is of a type known in the art for signing e-mail with existing types of certificates, and not configured to enforce the TOS for the certificate class.

In this embodiment, the certificate management system 110 is separate from the certificate status servers 116, but in other embodiments they could be physically and/or logically integrated. The certificate status servers 116 are, therefore, generally independent of the certificate management system 110, which allows for scalability. In one form, each certificate is validated by one of the certificate status servers 116. More servers can easily be added to scale up the certificate status capability. In such a case, the EAS 120 can include an algorithm that determines which of the certificate status servers 116 to use for authentication. The certificate status checking servers 116 can each be configured with a certificate status module 114 configured to determine if an e-mail violates the TOS for its certificate's class, and can maintain a copy of the TOS. The chosen status server can transmit a revocation or suspension message to the certificate management system 110, if necessary. The certificate management system 110 then notes the status.

In various embodiments, the signature module 146 could also be configured to enforce the TOS for the class associated with the certificate, either alone or in combination with certificate issuance module 112 or certificate status module 114. If the user's certificate has been revoked or suspended, the certificate issuance module 112 can prompt signature module 146 to no longer sign e-mails with the certificate.

Presuming that sender S at computer 140 has sent an e-mail addressed to a recipient U1 at computer 132, the e-mail is received by EAS 120. Filter module 122 is configured to determine the identity of the sender of a received e-mail and the class based on the certificate—if the e-mail was signed. Filter module 122 then communicates with the certificate status module 114 to determine the status of the certificate, e.g. valid, suspended or revoked. Preferably the status checking is done in real or near-real time so that e-mail delivery is not unnecessarily delayed. In the preferred form, certificate status module 114 is contacted by the filter module 122 every time a signed e-mail is received to determine if the certificate is valid and then determines if the certificate should be revoked based on whether or not the received e-mail violates the TOS associated with the class of the certificate.

The certificate status module 114 can be configured to accumulate metrics for each certificate (e.g. the number of signed e-mails sent over a period of time), and can be used to revoke certificates in real time on the basis of user behavior. Real-time status checking enables revocation of an issued certificate as soon as the sender has violated its TOS. Counting e-mails also allows the certificate status module 114 to monitor status requests for certificates issued by other systems and not necessarily containing an e-mail class. In this implementation, in the absence of an e-mail class, the certificate status module 114 can treat the certificate in the same manner as a certificate for one of the defined classes.

If the e-mail was signed and the certificate is valid, EAS 120 passes the e-mail to e-mail server 150. In this example, the intended recipient is user U1 at computer 132, which is part of an organization's network and behind firewall 180. E-mail server 150 receives e-mails intended for the recipient and the recipient can view them on its respective device, e.g., on one of computers 130, by accessing e-mail server 150. User U1's computer 132 also includes an e-mail client program 134, such as Outlook, and can also include a signature module 136 as an add-on to e-mail client program 134. Signature module 136 can be similar to signature module 146 of sender computer 140. As a recipient, signature module 136 is configured to process signed e-mails by recognizing the certificate. In this manner, with sender-based authentication already accomplished, the certificate is used in a manner similar to other certificates known in the art, for example in a PKI approach.

Unsigned e-mail can be handled in accordance with the recipient's preferences. For example, a "challenge-response" approach can be implemented by the EAS 120 as a default for unsigned e-mails. The challenge-response can ask the sender S to confirm that it sent the e-mail—this eliminates spammers sending out large volumes of e-mails. The challenge can also include a link and a prompt for the sender S to obtain a certificate from certificate management system 110. This would eliminate challenges for future e-mails by the sender S.

Additionally, certification management system 110 can be configured such that misclassification of an e-mail by the sender results in the certificate being revoked or suspended, as a violation of the TOS for the certificate class. For example, someone using a class 1 certificate to send class 3 e-mail can have its certificate revoked or suspended, so can be reduced to sending unsigned e-mail. The revocation or suspension can be automated, it need not require lengthy adjudication: the certificate authority becomes a de facto real time UCE notification system as explained below, and the rules governing certificate use can be contractual and need not require further enforcement mechanisms, beyond the technical implementation.

Filter System & User Preferences

The filter system can be implemented in any of a variety of ways, e.g., as an add-on to the e-mail client, as a standalone server, or as part of an existing e-mail server.

FIG. 1B provides an embodiment where the filter system takes the form of filter module 122 installed on EAS 120 as the primary authentication functionality of EAS 120, which can be viewed as a proxy e-mail server.

The filter module 122 can be configured to understand common address book formats so it can read address books of users to generate a "white list" of pre-approved e-mail senders or user-specific white lists, i.e., one for each user based on that user's address book. Or there can be both a global white list that is supplemented by a user's own white list for e-mail addressed to the user. It should also be able to parse e-mail folder trees in order to extract white list e-mail addresses from existing e-mail.

As a proxy e-mail server EAS 120 is preferably able to serve multiple accounts with different POP servers. Once filter module 122 is installed and configuration of EAS 120 is complete, the install script can be configured to contact users 130, e.g., with an e-mail to solicit configuration of their respective e-mail clients to process e-mail received by EAS 120, e.g., to pick up all e-mail from proxy e-mail server 120.

FIG. 1C provides a filter system embodiment where the filter module 122 is implemented as an add-on to an e-mail client at the user's computer 132, along with the signature module 136. The steps to install the add-on filter module 122 on user computer 132 can include downloading the add-on filter module 122 with an add-on installation script. Running the installation script installs the add-on filter module 122 and configures the e-mail client 134 to process all e-mail using that add on filter module 122. The user can also set up user preferences as described above.

As part of the configuration, each user can configure user preference parameters for handling received e-mails, setting up a user white list and black list. One preference can be to determine what action to take when an e-mail without a signature is received. The options can include challenge-response or manual user handling, that is, where the user determines whether to white list, black list, or challenge the sender. Another preference can allow the user to define at least some of the content of a message to be sent in a challenge-response. Certain elements of the challenge-response message could be made not editable, such as the information on how to obtain a certificate. Another preference can allow the user to define the classes of e-mail to accept and how to deal with them. For example, the user can choose not to accept any "class 3" e-mail or to route all such e-mail to a special folder.

Figure 2:
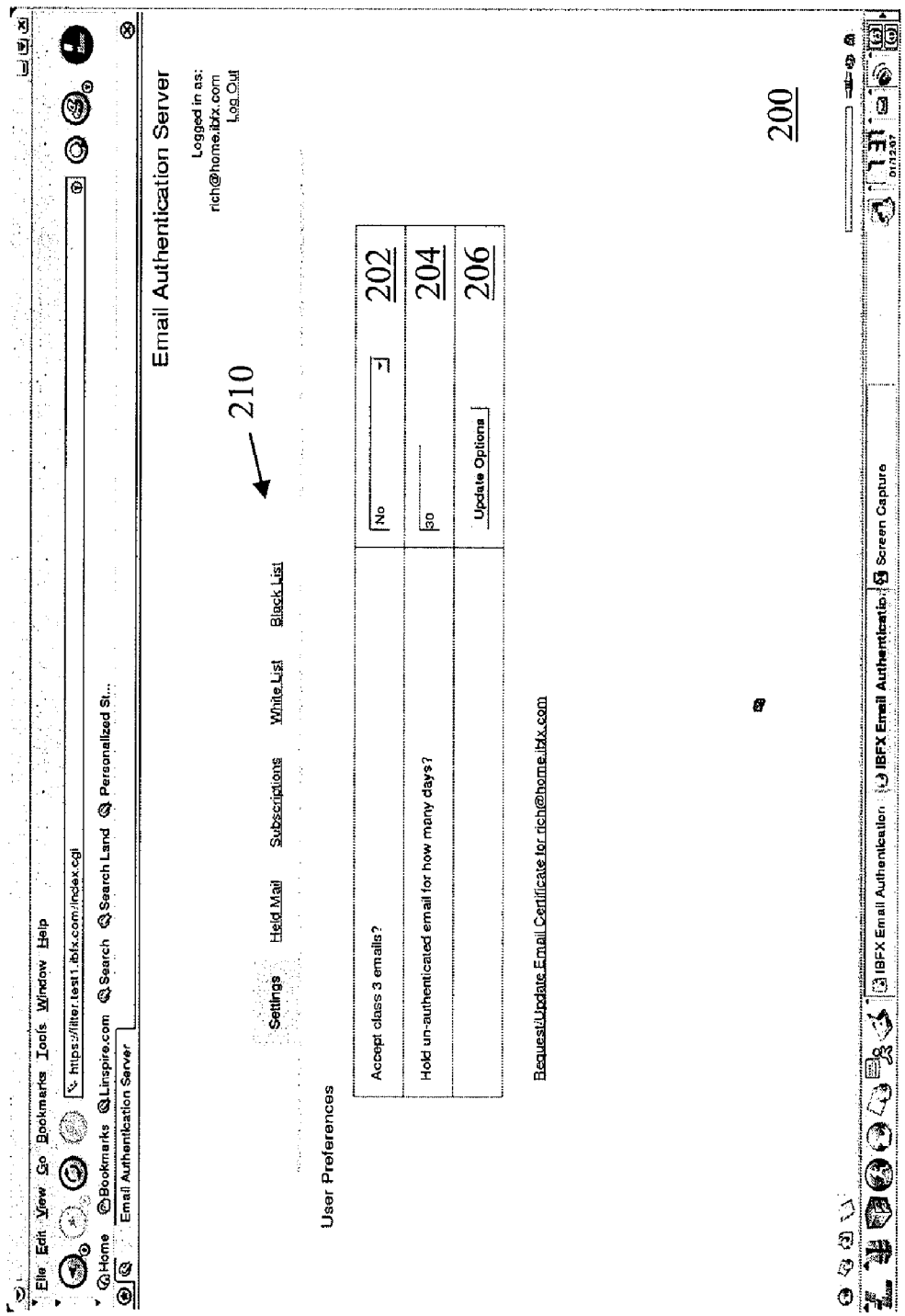
FIG. 2 is an embodiment of a screen that can be used for setting up user preferences.

FIG. 2 is an embodiment of a screen 200 that can be generated by EAS 120 to enable the user's input of its preferences. As is shown, a field 202 for identifying a preference for whether or not the user will accept class 3 e-mail (e.g., unsolicited bulk e-mail) is provided. This preference is used to determine whether such e-mail should be delivered to the user or discarded prior to delivery. A field 204 can be included for identifying a period of time for holding unidentified e-mail before it is discarded, e.g., unsigned e-mails. As is indicated by tabs 310, the user can login and view its held e-mails.

Tabs 210 also include a "white list" tab and a "black list" tab, selection of which renders screens to input the appropriate sender identifying information. E-mail from white-listed members is always delivered, while e-mail from black-listed members is not delivered. Input of e-mail addresses or domain names can be used to make white lists and black lists. Selection of "Update Options" button 206 causes the preferences to be saved. The user account and preference information can be maintained at admin system 160, and later updated by the user.

Certificate Issuance

Certificates can be issued using any of a number of approaches and can generally be implemented in a PKI context. Additionally, user verification can be used as part of the certificate issuance process. For example, two basic automated processes can be used to offer a moderate level of trust: credit card verification and telephone verification. While the exact mix of processing can differ, each method of verification is in use now for issuance of traditional certificates. Credit card verification, with or without charging, can clearly identify a card holder uniquely. To further increase the trust level, or to handle those that do not have a credit card (the young, for example), this approach could be supplemented with an automated "call back" system. Such systems are in use now for issuing server SSL certificates and simply require that a phone number be entered as part of the application process. That phone number is then dialed and the applicant has to enter a code to verify its request. Even in the absence of a credit card, this ties a certificate to a phone number and verifies that that phone number was used to request the certificate. Combined with caller-id this provides a measure of authentication, where misuse of a certificate associated with a phone number could be used to void the certificate and black list the associated phone number so that future certificates are not issued in association with that phone number, at least for a period of time. Rules can also be established for restricting the number of certificates that can be associated with a phone number.

When levels of trust are used, a certificate can carry information about its level of trust. For example, a certificate with both credit card and phone verification can be assigned a higher level of trust than those that only include one level of trust. The level of trust can be embedded in the certificate and considered during authentication of e-mails signed with the certificate.

As a general rule, certificates are issued based on a certificate request. Certificates can be requested for specific classes of e-mail, such as those discussed above. A single individual could request certificates for more than one class, but each would preferably be a separate certificate. In such a case, the user can choose one of the certificates as a default for signing e-mails, with the option to choose from among its certificates as needed for specific e-mails.

In this embodiment, certificate requests for users 130 are made via EAS 120, which in turn communicates with certificate management system 110 for issuance of the certificates. For example, certificate issuance module 112 of certificate management system 110 can act as a Certificate Authority that issues personal certificates that can be used with the anti-UCE system.

In the illustrative form, users U1, U2, U3 at computers 130 and user S at computer 140 could each request a certificate through EAS 120. EAS 120 can be configured to serve Web pages that facilitate the process. For example, users U1, U2, U3 at computers 130, which are behind firewall 180 can be prompted to request certificates as an organization requirement or recommendation. In the case of external user S at computer 140, upon trying to send an e-mail to one of users 130, EAS 120 could issue a challenge-response in the form of an e-mail that includes a link to EAS Web pages that allow the sender to request a certificate from certificate management system 110, as indicated by the dotted line between certificate management system 110 and user device 140 in FIGS. 1B and 1C.

Figure 3:
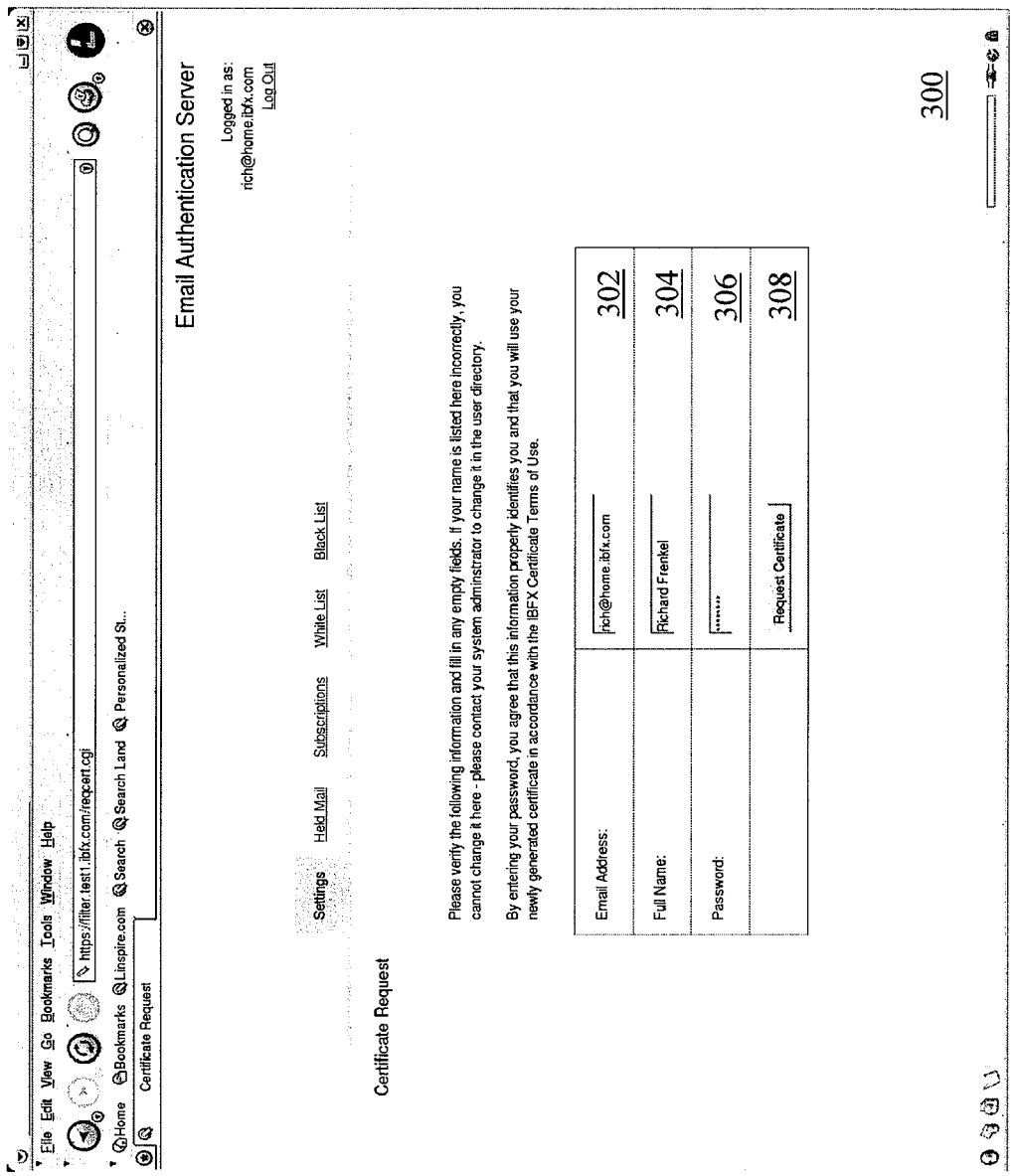
FIG. 3 is an embodiment of a screen that can be used for certificate requests.

FIG. 3 shows an embodiment of a screen 300 that can be generated by EAS 120, using the example of FIGS. 1A and 1B, to enable a user to request a certificate, which can be provided by certificate management system 110. In this embodiment filter module 122 is configured to perform the substantive tasks of EAS 120 described herein. Screen 300 solicits certain personal information that can be used for identifying the user. In this embodiment, fields are included for input of an e-mail address 302 and a full name 304. Fields for input of a user's address and/or phone number can also be included. A password field 306 can be included to allow the user to define a password for further access to its information. This process can establish a user account with EAS 120. Other optional information can also be requested, for example a credit card number that can be used in the authorization process. As discussed earlier, the phone number can be used to give some measure of trust during authentication. Selecting button 308 causes certificate management system 110 to process the request.

EAS 120 can contact certificate management system 110 to check the entered information against registry database 113 of information used for prior certificates. If the phone number and/or credit card number were already used for certificate issuance, the phone number and/or credit card must not be on a list of revoked certificates. Preferably only a limited number of certificates will be issued to one phone number and/or credit card number. It is envisioned that other types of verification techniques could additionally or alternatively be used in other embodiments.

For instance, as another form of verification of the certificate requester, an e-mail can be sent to the e-mail address given by the user to confirm the e-mail address. The e-mail can include a code to be used by the requester in the next step. In some embodiments EAS 120 can be configured to initiate a call to the phone number given by the requester. The requester must answer the phone and enter the code sent in the e-mail. This form of telephone verification for a certificate request is provided as an example, not as a limitation.

EAS 120 can additionally, or alternatively, use other information to automatically verify the requester. For example, credit card verification can check that the name, address, and credit card information match that provided by the user.

Anyone in the organization can request a certificate to be bound to their e-mail address and name as recorded in a directory (e.g., LDAP, Active Directory) maintained at admin system 160, without further identification. The certificate is created, signed by the certificate management system 110 (acting as a root Certificate Authority), and an e-mail is sent to the associated e-mail address. By following a link in that e-mail, and utilizing the password the user entered, the user's Web browser can add the certificate to the appropriate certificate cache, from which it can be used to sign e-mails automatically. Accordingly, the user sets up its e-mail client 134, 144 and signature module 136, 146 to sign and send e-mail using the certificate obtained in the above manner.

The issued certificate can be an S/Mime certificate used for e-mail signing and (optionally) encryption. Normally, S/Mime certificates are only bound to an e-mail address without further authentication. However, the certificates issued herein are bound not just to an e-mail address, but also to an individual. When combined with real-time revocation of certificates for misuse, this becomes a powerful tool against UCE.

In addition to user identification fields, each certificate in accordance with the present invention preferably includes other certain user-defined fields (e.g., as X.509 v3 extensions). These other fields include: E-MAIL_CLASS (e.g., a number, 1, 2, 3 and possibly others), and AUTHENTICATION_TYPE, used to identify the level of trust associated with the certificate. The technology for enabling an e-mail client and signature module to sign e-mails with previously known types of certificates exists. Many e-mail clients can do so automatically with X.509 version 3 certificates. Thus, signing an e-mail with a certificate is not described in detail herein.

Receiving E-mail

Figure 4:
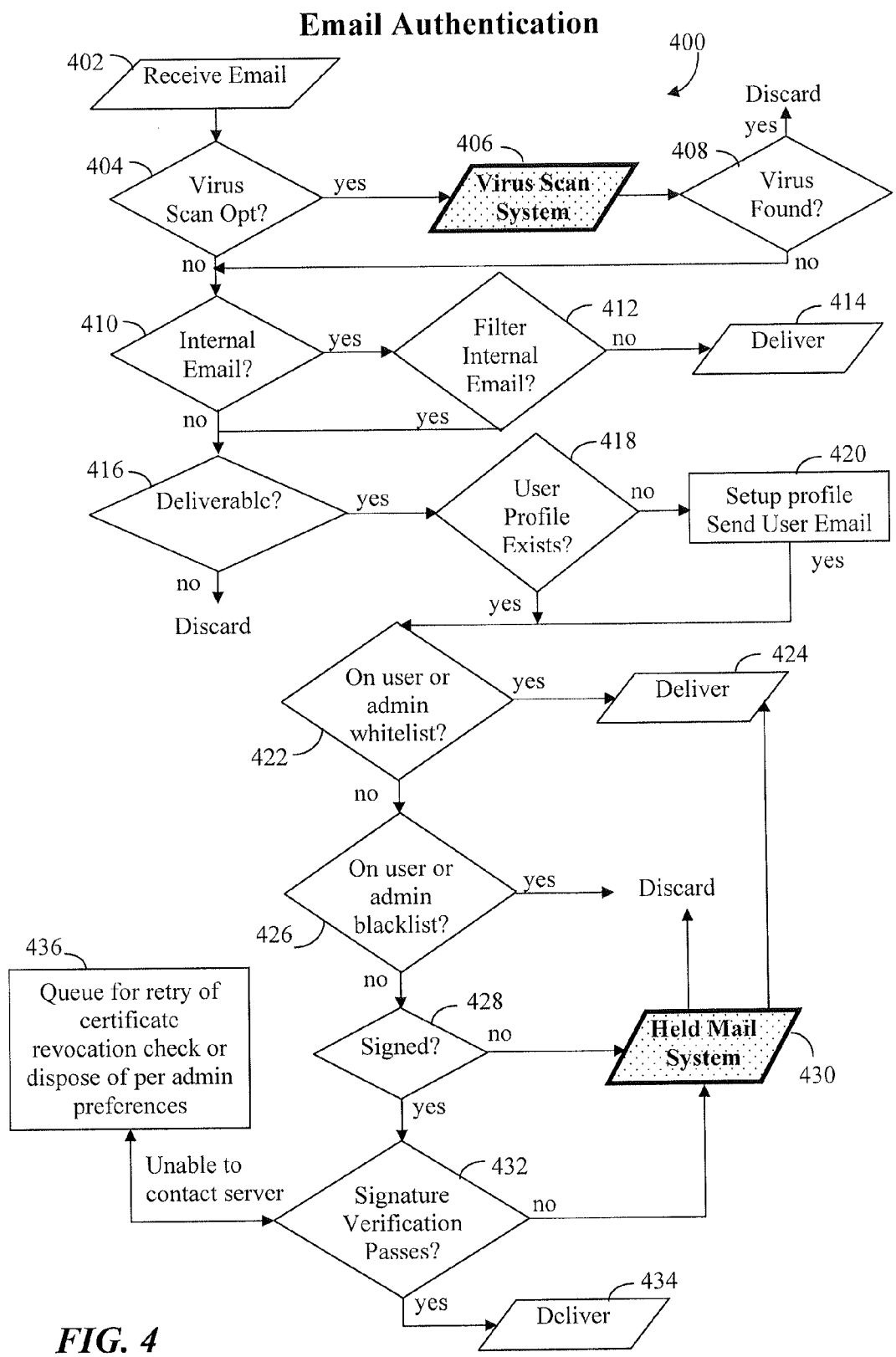
FIG. 4 is an embodiment of a method of e-mail authentication.

FIG. 4 is an embodiment of a method 400 for processing an e-mail message from an external sender to a recipient, e.g., user U1 at computer 132. The method 400 will be explained relative to the entities of FIGS. 1A and 1B for convenience, with filter module 122 configured to perform the substantive tasks of EAS 120, and certificate status module 114 configured to perform the substantive tasks of certificate status servers 116.

In step 402, the e-mail is received by EAS 120. A virus scanning option can be included, wherein in step 404 EAS 120 forwards the e-mail to a virus scanning system or module in step 406. If a virus is found in the e-mail or its attachments in step 408, the e-mail is discarded.

If a virus was not found in step 410 or the virus scanning option was not provided in step 406, EAS 120 determines if the e-mail is internal e-mail in step 410. Optionally, internal e-mail can be filtered, as indicated in step 412. If internal e-mail is not to be filtered, the e-mail is delivered in step 414, e.g., from U1 to U2 via e-mail server 150. If internal e-mail is to be filtered or if the e-mail was determined in step 410 to be an external e-mail, e.g., from sender S at computer 140, then the process continues to step 416 where a determination can be made of whether or not the e-mail is deliverable.

In step 416, the determination of whether the e-mail is deliverable can include one or more of a variety of checks. For example, if the delivery address of the e-mail is not in its domain list the e-mail is discarded. If the sender's DNS record supports it, checking the sender's IP address against its domain name record (SPF) can be done. If this check fails, the e-mail can be discarded. This step can include querying e-mail server 150 to determine if the "To" address of the intended recipient is valid. If not the e-mail can be discarded.

In step 418 a determination is made of whether or not a user profile exists for the intended recipient of the e-mail. If the e-mail is the first message sent to a particular user, for example, a profile might not exist. EAS 120 can be configured to enable the recipient to set up an account in step 420, e.g., by sending the user an e-mail giving login information. Setting up the account can include configuring preferences, as discussed with respect to FIG. 2. The preferences can determine processes for handling unsigned e-mail, setting up a white list and/or black list, and for handling unsolicited e-mail, as examples.

In step 422, a determination is made of whether or not the sender is on a white list of the user or an admin created global white list. If so, the e-mail is delivered in step 424. If not, a determination is made, in step 426, if the sender is on a black list of the user or an admin created global black list. If so, the e-mail is discarded. In an alternative embodiment, if a sender is on a white list of a user, EAS 120 can be configured to determine if the sender is also on an admin black list and, if so, the e-mail can be discarded rather than delivered to the user.

If the sender was not on a black list, then the process continues to step 428 to determine if the e-mail was signed with a certificate. If the e-mail was not signed it can be held in step 430. For e-mail neither signed or for which the sender is not on a white list, a "challenge-response" message can be sent to the sender. The e-mail can be held in abeyance pending the sender's response to the "challenge" in step 430. The challenge e-mail can provide a variety of functions and information. The challenge e-mail can inform the sender about the nature of the challenge in the context of anti-UCE system 100. It can also provide instructions on how the sender can obtain a certificate, which will allow future e-mail from the sender to pass through EAS 120 without challenge.

For those senders who choose not to obtain a certificate, the challenge e-mail will also allow them to send a confirmation message that can be used to add the user to the recipient's "white list" and release the original e-mail, as in step 424. If the sender responds with either a signed response, or a correct response to the challenge, the sender's e-mail is released and it is added the recipient's white list. None of this involves any action on the part of the intended recipient.

If no response is received to the challenge after a suitable time period (e.g. 30 days), the e-mail can be discarded or moved to a "dead letter box."

Figure 5:
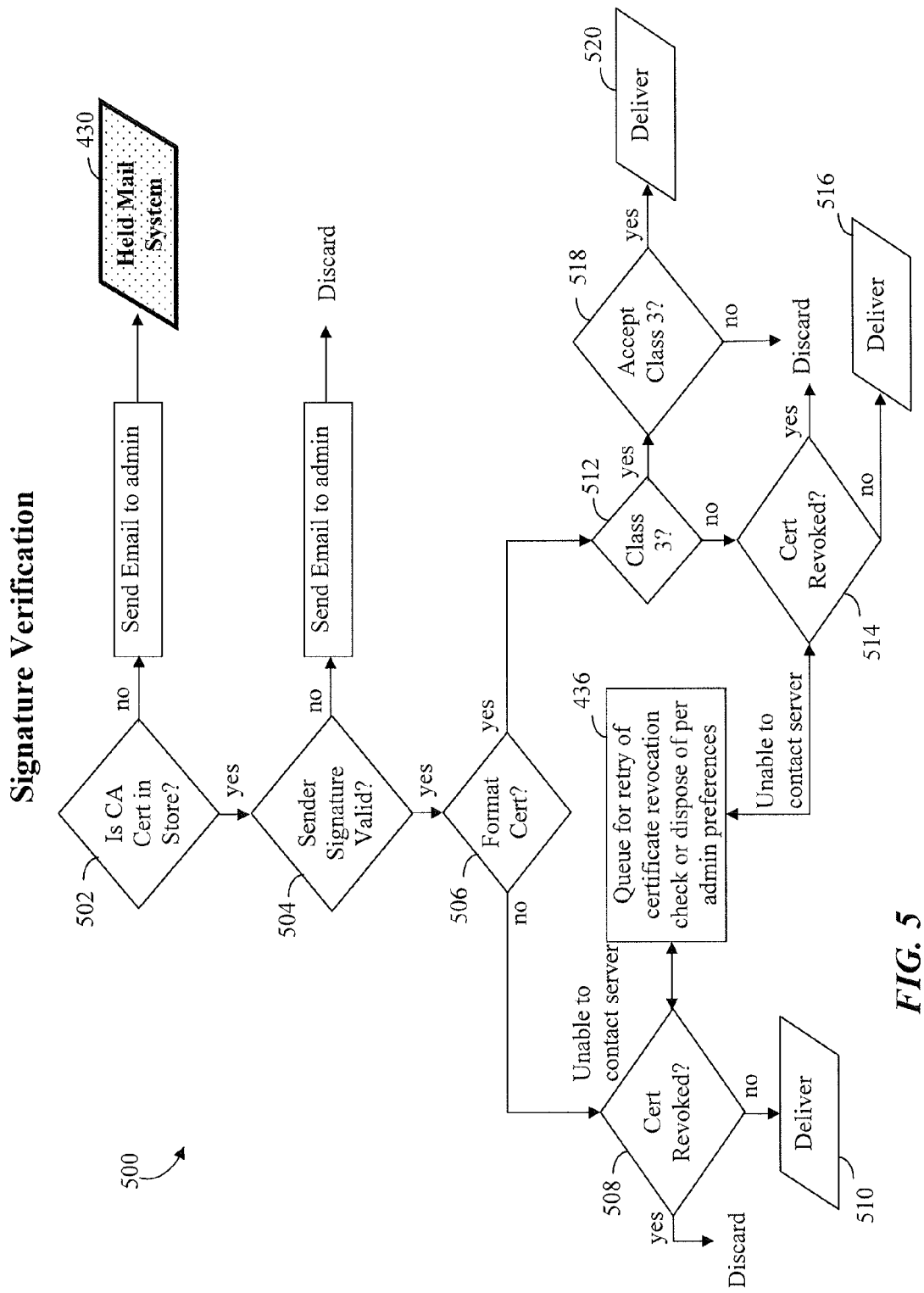
FIG. 5 is an embodiment of a method of signature verification.

If it was determined in step 428 the e-mail was signed, the process continues to step 432 for signature verification, a detailed embodiment of which is provided in the method 500 of FIG. 5. The possible outcomes from step 432 are that the e-mail is held in step 430, as described above, discarded, or delivered in step 434. If the certificate status servers 116 are not accessible, the request for verification of the certificate can be queued for retry or the e-mail can be otherwise disposed of in accordance with the recipient's preferences in step 436, e.g., discard unknown unsigned e-mail (see step 420).

Method 500 of FIG. 5 provides one possible embodiment for step 432 of FIG. 4. In step 502 a determinate is made of whether the e-mail was signed using a certificate other than from certificate management system 110 (i.e., without the anti-UCE system 100 extensions) or using a certificate from another Certificate Authority that is on a list of accepted root CAs. Other systems can issue certificates without the unique extensions provided herein, and a list of those CAs can be maintained at EAS 120 and/or admin system 160, or at certificate management system 110. Certificates from those CAs can also be analyzed. If the e-mail was not signed by a certificate from certificate management system 110 or a listed CA, then the e-mail is held in step 430, e.g., by admin system 160, as discussed with respect to FIG. 4.

If the check in step 502 was affirmative, then the process continues to step 504 to determine if the sender's signature is valid. For example, EAS 120 can check with the CA that issued the certificate to determine the validity of the certificate in real time, using the Online Certificate Status Protocol (OCSP), for example. If the CA reports that the certificate is not valid, the e-mail can be discarded. In step 506, EAS 120 determines if the certificate is in the format used by the certificate management system 110, e.g., if the e-mail is signed using an X.509 certificate with the appropriate e-mail class extensions. If not, EAS 120 can treat the e-mail as a class 1 (i.e., personal) e-mail and proceed to step 508.

In step 508 EAS 120 checks with certificate status servers 116 to determine if class 1 limits are exceeded. The certificate status servers 116 keeps count of these checks to enforce the terms of service for the certificate. If the class 1 limits are exceeded the certificate can be revoked, since this would be a violation of the terms of services for the certificate. If the certificate has been revoked the e-mail is discarded. But if the certificate has not been revoked the e-mail is delivered in step 510. If certificate management system 110 or certificate status servers 116 cannot be contacted, the process transitions to step 436, as discussed with respect to FIG. 4.

If in step 506 the determination was that the certificate was in the format provided by certificate management system 110, i.e., it has the appropriate class definition, then the process continues to step 512. In step 512 a determination is made of whether the e-mail is a class 3 e-mail. If not, i.e., it is a class 1 or 2 e-mail in accordance with this embodiment, then EAS 120 checks with certificate status servers 116 in step 514 to determine if the certificate has been revoked or should be revoked based on a violation of the terms of service of the e-mail. If it is determined that the certificate has not, and should not, be revoked, the e-mail is delivered in step 516.

For determining whether such a certificate has been or should be revoked, the interaction between EAS 120 and certificate status servers 116 includes providing an identity of the sender (e.g., the sender's e-mail address) and the class of e-mail to certificate status servers 116, which responds with an acknowledgment that the certificate is valid or with an indication that the certificate has been suspended or revoked. The certificate status servers 116 can also make real-time determinations about certificate violations to revoke or suspend certificates as needed, by accumulating usage metrics for each individual certificate and using those to detect a violation of terms of service for specific certificates. For example, if a sender claims a piece of e-mail is "class 1" and there are 201 certificate inquiries made in short order, the certificate status servers 116 can suspend or revoke the certificate, presuming there was a class 1 TOS limitation of 200 e-mails per day, for example. In this way, if a certificate is abused, at most the first 200 recipients will possibly be affected, in this example. If the TOS were not violated, the certificate status servers 116 can also communicate with certificate management system 110 to determine if the certificate is indicated as suspended or revoked in registry 113.

If the certificate status servers 116 are not available, then the process transitions to step 436, as discussed above. In some embodiments, if the certificate cannot be verified with the certificate status servers 116, the signed e-mail can be accepted as a valid class 3 e-mail, for example. However, accepting signed e-mail as valid when certificate status servers 116 cannot be reached can open an opportunity for exploitation, since simultaneously sending UCE and launching a denial of service attack on the certificate status servers 116 could allow UCE using a stolen certificate to reach the user, as well as many other users. Therefore, holding such e-mail in abeyance until the certificate status servers 116 can be reached provides a more conservative course of action.

If in step 512 it was determined that the e-mail was a class 3 e-mail, the e-mail is disposed of according the administrative and/or user preferences for class 3 e-mail, as indicated in step 518. If the preferences allow class 3 e-mail, the e-mail is delivered in step 520, else it can be discarded.

Filtering System Overview

In the illustrative form, the filtering functionality can be embodied in filter module 122 installed on EAS 120 or as an add-on to an e-mail client. In any of the various embodiments, filtering can include the following features:

1. E-mail Authentication using industry standard S/Mime certificates and OCSP real time certificate checking to identify and authenticate an e-mail's sender.

2. UCE filtering with the emphasis on sender authentication, but also implementing a Sender Policy Framework (SPF) and white list authentication to be completely compatible with existing e-mail stream.

3. E-mail classification from Class 1 (individual e-mails for business or personal communication) through Class 3 (for bulk unsolicited e-mail). This makes it possible to filter e-mail by its purpose without having to parse content.

4. Virus checking can be optionally added.

5. Local user authentication using regular network login methods.

6. S/Mime Certificate issuance for organizations, without further administrative effort, and at very low cost.

7. Works with S/Mime certificates issued by any approved Certificate Authority, such as Verisign™. A list of approved CA's can be included that can be added to by an organization.

8. Works with smart cards and their embedded certificates.

9. Can act as an e-mail "firewall" passing all filtered e-mail on to the current e-mail server, such as Exchange™ (by Microsoft Corporation), for delivery. Users do not have to change their e-mail server.

10. Simple Web page interface provided for users and administrators.

While the foregoing has described what are considered to be the best mode and/or other preferred embodiments, it is understood that various modifications can be made therein and that the invention or inventions can be implemented in various forms and embodiments, and that they can be applied in numerous applications, only some of which have been described herein. It is intended by the following claims to claim that which is literally described and all equivalents thereto, including all modifications and variations that fall within the scope of each claim.

What is claimed is:

1. An anti-UCE certificate system accessible via a network, the system comprising:
 at least one storage media having stored therein a plurality of certificates, each of the plurality of certificates having a class that identifies a different type of e-mail, each class having different terms of service defining e-mail transmission limitations for the class;
 a certificate issuance module configured to issue certificates from the plurality of certificates to specific e-mail users, the issued certificates configured to sign e-mails generated by the respective users; and
 a certificate status module configured to accept requests for the status of the certificates from signed e-mails, enforce the terms of service of each certificate by accumulating metrics for each certificate, and suspend or revoke a certificate if it is used in violation of its terms of service, wherein the certificate status module is configured to determine if a number of e-mails signed with a certificate in a predefined time period exceeds a threshold number of e-mails allowed in the predefined time period for the certificate's class.

2. The system of claim 1, wherein each certificate is valid for only one class.

3. The system of claim 1, wherein the plurality of certificates includes a first certificate that has a first class that identifies an e-mail as a personal e-mail, a second certificate that has a second class that identifies an e-mail as a solicited e-mail, and a third certificate that has a third class that identifies an e-mail as an unsolicited e-mail.

4. The system of claim 1, wherein the certificate issuance module is configured to maintain a registry of issued certificates with an indication of validity for each issued certificate.

5. The system of claim 1, wherein the certificate issuance module forms part of a certificate management system and the certificate status module forms part of a certificate status system comprising a set of servers, each server configured to accumulated metrics and enforce the terms of service for a set of certificates from the issued certificates.

6. The system of claim 1, wherein, as a prerequisite of issuing a certificate, the certificate issuance module is configured to authenticate a user of the certificate using at least one of a phone number, credit card number, or an e-mail address of the user.

7. The system of claim 1, wherein the certificate issuance module is configured to deny issuance of a certificate to a user if the user has a prior issued certificate with a status other than valid.

8. The system of claim 1, wherein the certificate issuance module is configured to receive a Web-based certificate request from the user and to issue a certificate in response to the request.

9. An e-mail filtering system accessible via a network for authenticating a certificate used to sign an e-mail prior to delivering the e-mail from a sender to an intended recipient, the system comprising a filter module configured to:

determine a sender identity and a class of the e-mail from the certificate used to sign the e-mail;

obtain an indication of validity of the certificate from a certificate status module configured to determine validity based on the sender identity, the class, and accumulated metrics for the certificate, wherein the certificate status module is configured to determine if a number of e-mails signed with a certificate in a predefined time period exceeds a threshold number of e-mails allowed in the predefined time period for the certificate's class; and forward the e-mail to the recipient if the certificate is valid, wherein the certificate is from a plurality of certificates, each certificate having a class that identifies a different type of e-mail, each class having different terms of service defining e-mail transmission limitations for the class.

10. The system of claim 9, wherein each of the plurality of certificates is valid for only one class.

11. The system of claim 9 wherein the plurality of certificates includes a first certificate that has a first class that identifies an e-mail as a personal e-mail, a second certificate that has a second class that identifies an e-mail as a solicited e-mail, and a third certificate that has a third class that identifies an e-mail as an unsolicited e-mail.

12. The system of claim 9, wherein the validity of the certificate is further determined based on whether the accumulated metrics indicate a violation of the terms of service for the class.

13. The system of claim 9, wherein the filter module is further configured to hold or discard the email if the certificate is not determined to be valid.

14. The system of claim 9, wherein the filter module is further configured to initially determine if the e-mail has been signed using the certificate.

15. The system of claim 14, wherein the filter module is configured to determine if the sender of an unsigned e-mail is on a black list and, if so, to discard the unsigned e-mail.

16. The system of claim 14, wherein the filter module is configured to determine if the sender of the e-mail is on a white list and, if so, to send the e-mail to the recipient.

17. The system of claim 14, wherein the filter module is configured to present the sender of an unsigned e-mail with a challenge-response and, if the sender satisfies the challenge-response, to send the e-mail to the recipient.

18. The system of claim 14, wherein the filter module is configured to present the sender of an unsigned e-mail with an opportunity to obtain a new certificate.

19. The system of claim 14, wherein the filter module is configured to enable e-mail users to define preferences for handling unsolicited e-mail from unknown senders.

20. The system of claim 9, wherein the filter module is configured as an add-on to an e-mail client program.

21. The system of claim 9, wherein the e-mail filtering system is configured as a proxy e-mail server.

22. An anti-UCE system comprising:

a certificate issuance module configured to issue certificates to e-mail users and to maintain a registry of issued certificates with an indication of validity for each issued certificate, wherein there are a plurality of possible certificates, each certificate having a class with associated terms of service defining e-mail transmission limitations for the class; and a certificate status module configured to accept requests for the status of certificates from signed e-mails, enforce the terms of service of each certificate by accumulating metrics for each certificate, and suspend or revoke a certificate if it is used in violation of its terms of service, wherein the certificate status module is also configured to determine if a number of e-mails signed with a certificate in a predefined time period exceeds a threshold number of e-mails allowed in the predefined time period for the certificate's class; and a filter module configured to receive e-mails intended for a set of e-mail users as recipients, and to determine if a received e-mail is signed with a certificate from the plurality of certificates and, if signed, to determine from the certificate status module if the certificate is valid based on an identity of the sender and a class indicated in the certificate, and to forward the e-mail to an intended recipient if the certificate is valid.

23. The system of claim 22, wherein the plurality of certificates includes a first certificate that has a first class that identifies an e-mail as a personal e-mail, a second certificate that has a second class that identifies an e-mail as a solicited e-mail, and a third certificate that has a third class that identifies an e-mail as an unsolicited e-mail.

24. The system of claim 22, wherein the certificate can have a status of valid, suspended, or revoked.

25. The system of claim 22, wherein, as a prerequisite of issuing the certificate, the certificate issuance module is configured to authenticate the user using at least one of a phone number, credit card number, or e-mail address of the user.

26. The system of claim 22, wherein the filter module is configured to determine if the sender of an unsigned e-mail is on a white list and, if so, to send the unsigned e-mail to the recipient.

27. The system of claim 22, wherein the filter module is configured to determine if the sender of an unsigned e-mail is on a black list and, if so, to discard the unsigned e-mail.

28. The system of claim 22, wherein the filter module is configured to present the sender of an unsigned e-mail with a challenge-response and, if the sender satisfies the challenge-response, to send the e-mail to the recipient.

29. The system of claim 22, wherein the filter module is configured to present the sender of an unsigned e-mail with an opportunity to obtain a new certificate.

30. The system of claim 22, wherein the filter module is configured to provide a link enable the set of e-mail users to define preferences for handling unsolicited e-mail from unknown senders.

31. A method of filtering e-mail by authenticating a certificate used to sign an e-mail prior to delivering the e-mail from a sender to an intended recipient, the method comprising:
    determining a sender identity and a class of the e-mail from the certificate used to sign the e-mail;
    obtaining an indication of validity of the certificate based on the sender identity, the class, and accumulated metrics for the certificate, including determining if a number of e-mails signed with a certificate in a predefined time period exceeds a threshold number of e-mails allowed in the predefined time period for the certificate's class; and
    forwarding the e-mail to the recipient if the certificate is valid,
    wherein the certificate is from a plurality of certificates, each certificate having a class that identifies a different type of e-mail, each class having different terms of service defining e-mail transmission limitations for the class.

32. The method of claim 31, wherein each of the plurality of certificates is valid for only one class.

33. The method of claim 31, wherein the plurality of certificates includes a first certificate that has a first class that identifies an e-mail as a personal e-mail, a second certificate that has a second class that identifies an e-mail as a solicited e-mail, and a third certificate that has a third class that identifies an e-mail as an unsolicited e-mail.

34. The method of claim 31, including further determining the validity of the certificate based on whether the accumulated metrics indicate a violation of the terms of service for the class.

35. The method of claim 31, including holding or discarding the email if the certificate is not determined to be valid.

36. The method of claim 31, including initially determining if the e-mail has been signed using the certificate.

37. The method of claim 36, including presenting the sender of an unsigned e-mail with a challenge-response and, if the sender satisfies the challenge-response, sending the e-mail to the recipient.

38. The method of claim 36, including presenting the sender of an unsigned e-mail with an opportunity to obtain a new certificate.

39. The method of claim 31, including determining if the sender of the e-mail is on a white list and, if so, sending the e-mail to the recipient.

40. The method of claim 31, including determining if the sender of an e-mail is on a black list and, if so, discarding the unsigned e-mail.

41. The method of claim 31, including enabling e-mail users to define preferences for handling unsolicited e-mail from unknown senders.

42. An anti-UCE method comprising:
    issuing certificates to e-mail users and maintaining a registry of issued certificates with an indication of validity for each issued certificate, wherein there are a plurality of possible certificates, each certificate having a class with associated terms of service defining e-mail transmission limitations for the class; and
    enforcing the terms of service of each certificate by accumulating metrics for each certificate and suspending or revoking a certificate if it is used in violation of its terms of service based on the accumulated metrics, including determining if a number of e-mails signed with the certificate in a predefined time period exceeds a threshold number of e-mails allowed in the predefined time period for the certificate's class; and
    receiving e-mails intended for a set of e-mail users as recipients, determining if a received e-mail is signed with a certificate from the plurality of certificates and, if signed, determining if the certificate is valid based on an identity of the sender and a class indicated in the certificate, and
    forwarding the e-mail to an intended recipient if the certificate is valid.

43. The method of claim 42, wherein the plurality of certificates includes a first certificate that has a first class that identifies an e-mail as a personal e-mail, a second certificate that has a second class that identifies an e-mail as a solicited e-mail, and a third certificate that has a third class that identifies an e-mail as an unsolicited e-mail.

44. The method of claim 42, wherein the indication of validity is an indication of valid or revoked.

45. The method of claim 42, wherein, as a prerequisite of issuing the certificate, the method includes authenticating the user using at least one of a phone number, credit card number, or e-mail address of the user.

46. The method of claim 42, including determining if the sender of an unsigned e-mail is on a white list and, if so, sending the unsigned e-mail to the recipient.

47. The method of claim 42, including determining if the sender of an unsigned e-mail is on a black list and, if so, discarding the unsigned e-mail.

48. The method of claim 42, including presenting the sender of an unsigned e-mail with a challenge-response and, if the sender satisfies the challenge-response, sending the e-mail to the recipient.

49. The method of claim 42, including presenting the sender of an unsigned e-mail with an opportunity to obtain a new certificate.

50. The method of claim 42, including providing a link configured to enable the set of e-mail users to define preferences for handling unsolicited e-mail from unknown senders.

* * * * *